United States Patent
Koshy

(10) Patent No.: US 10,348,363 B2
(45) Date of Patent: Jul. 9, 2019

(54) SYSTEM FOR INTERCONNECTING DEVICES FOR CREATING AUTOMATION SYSTEMS

(71) Applicant: KFX CIRCUITS AND SYSTEMS PRIVATE LIMITED, Bangalore (IN)

(72) Inventor: Nishil Thomas Koshy, Bangalore (IN)

(73) Assignee: KFX CIRCUITS AND SYSTEMS PRIVATE LIMITED, Bangalore (IN)

( * ) Notice: Subject to any disclaimer, the term of this patent is extended or adjusted under 35 U.S.C. 154(b) by 0 days.

(21) Appl. No.: 14/376,350

(22) PCT Filed: Feb. 5, 2013

(86) PCT No.: PCT/IN2013/000078
§ 371 (c)(1),
(2) Date: Aug. 1, 2014

(87) PCT Pub. No.: WO2013/121437
PCT Pub. Date: Aug. 22, 2013

(65) Prior Publication Data
US 2014/0376386 A1    Dec. 25, 2014

(30) Foreign Application Priority Data
Feb. 6, 2012   (IN) .............................. 438/CHE/2012

(51) Int. Cl.
*H04B 3/30* (2006.01)
*H04L 25/02* (2006.01)
(Continued)

(52) U.S. Cl.
CPC ................ *H04B 3/30* (2013.01); *H04B 3/00* (2013.01); *H04B 3/50* (2013.01); *H04L 12/2836* (2013.01);
(Continued)

(58) Field of Classification Search
CPC ..... H04L 12/28; H04L 12/26; H04L 12/2836; H04L 12/266; H04L 12/2602;
(Continued)

(56) References Cited

U.S. PATENT DOCUMENTS 4,767,168 A * 8/1988 Grandy ................ G02B 6/4202
385/53
8,705,527 B1 * 4/2014 Addepalli ............. H04W 4/046
370/389
(Continued)

*Primary Examiner* — Salvador E Rivas
*Assistant Examiner* — Rasha Fayed
(74) *Attorney, Agent, or Firm* — Barry Choobin; Patent 360 LLC

(57) ABSTRACT

The various embodiments provide a system for interconnecting a plurality of devices for budding automation systems. The system comprising on or more sensor units to transmit data along with a sensor device address an a network, one or more actuator units to receive the transmitted data, a monitoring unit to receive, monitor and record the transmitted data, a control unit to monitor functioning of devices on the network and transmit data to the actuators, a link unit to extend range of the network by retransmitting the signals received from one cable to other cables and an interface unit to convert signals to and from the network into a format of another communication protocol. The network comprises a plurality of devices connected to a single cable to communicate with other devices on the network by generating charge disturbances and detecting the charge disturbances propagated over the cable.

3 Claims, 2 Drawing Sheets

(51) Int. Cl.
*H04N 7/10* (2006.01)
*H04B 3/00* (2006.01)
*H04M 11/06* (2006.01)
*H04L 12/28* (2006.01)
*H04L 12/26* (2006.01)
*H04L 29/06* (2006.01)
*H04B 3/50* (2006.01)

(52) U.S. Cl.
CPC ........ *H04L 25/028* (2013.01); *H04L 25/0278* (2013.01); *H04L 25/0286* (2013.01); *H04L 25/0292* (2013.01); *H04L 43/0817* (2013.01); *H04L 43/12* (2013.01); *H04L 69/08* (2013.01); *H04M 11/066* (2013.01); *H04N 7/102* (2013.01)

(58) Field of Classification Search
CPC ... H04L 29/06; H04L 25/028; H04L 25/0264; H04L 43/0817; H04L 43/12; H04L 43/0876; H04L 43/00; H04L 69/08
USPC .................................................. 370/242, 389
See application file for complete search history.

(56) References Cited

U.S. PATENT DOCUMENTS

| | | | |
|---|---|---|---|
| 2006/0293784 A1* | 12/2006 | Braunstein | G07F 11/002 700/231 |
| 2007/0012112 A1* | 1/2007 | Kim | G01H 9/004 73/594 |
| 2010/0332373 A1* | 12/2010 | Crabtree | G06Q 40/04 705/37 |
| 2011/0204720 A1* | 8/2011 | Ruiz | B60L 11/1816 307/66 |
| 2012/0105637 A1* | 5/2012 | Yousefi | H04N 7/183 348/148 |
| 2012/0151007 A1* | 6/2012 | Mescher | G06F 11/3006 709/219 |
| 2012/0229162 A1* | 9/2012 | Guterman | G01R 31/2812 324/763.01 |
| 2013/0190943 A1* | 7/2013 | Wester | G05F 5/00 700/297 |
| 2013/0301584 A1* | 11/2013 | Addepalli | H04W 4/046 370/329 |

* cited by examiner

SYSTEM FOR INTERCONNECTING DEVICES FOR CREATING AUTOMATION SYSTEMS

RELATED APPLICATION

The present application is a national phase application of the International Application PCT/IN2013/000078 filed 5 Feb. 2013, which claims the priority of the Indian Provisional Patent Application No. 438/CHE/2012 filed on 6 Feb. 2012, the entire contents of which are incorporated herein by the way of reference.

BACKGROUND

Technical Field

The embodiments herein generally relate to communication systems and methods and particularly relates to a networking scheme for a local area. The embodiments herein more particularly relates to a system and method for providing communication between different devices m a network using a common wire cable.

Description of the Related Art

Generally a wired communication refers to a transmission of data over a wire-based communication technology. The examples for a wired communication network include the telephone networks, a cable television, an internet access, a fiber-optic communication, circuit level communication and the like. A waveguide, used for high-power applications, is considered as a wired communication scheme.

Conventional schemes for building management and home automation systems rely on dedicated wiring for each element of the system. These are typically used for controlling electrical appliances such as lights, fans and air conditioning units for increasing energy efficiency or remotely controlling the temperature or lights for ambience setting.

In basic systems, all the sensors and actuators are individually wired to a central unit which monitors all the sensors and controls the actuators. The extensive wiring requirement makes installation, debug and maintenance of such systems very difficult and expensive, thereby making such solutions practical only when wiring is planned upfront for buildings under construction. However, addition of extra sensors and actuators at a later stage still remains difficult.

Alternately, Ethernet based systems overcome this limitation by interconnecting all the different elements of the system using an existing Local Area Network (LAN). The central unit then communicates with each of the other units over the LAN. This greatly simplifies the wiring requirements and leaves enough scope to add new elements to the system. However, the added Ethernet interface significantly adds to the cost of the system besides the added overhead of maintaining a LAN. The failure of the central unit or the network equipments however will result in total system failure.

Hence, there exists a need for a networking scheme for building automation systems which enables communication between various devices of the network. Also there is a need for a networking scheme which interconnects the devices over a single cable. Further there is a need for a networking scheme which is cost-effective, easy to implement and maintain.

The above mentioned shortcomings, disadvantages and problems are addressed herein and which will be understood by reading and studying the following specification.

SUMMARY

The primary object of the embodiments herein is to provide a networking scheme for fine reconnecting devices for building management and home automation systems.

Another object of the embodiments herein is to provide a networking scheme which interconnects the various devices over a single cable.

Another object of the embodiments herein is to provide a networking scheme doing signaling using propagating charge disturbances on the cable Another object of the embodiments herein is to provide a networking scheme for building automation systems which enables independent multi-point monitoring and control.

Another object of the embodiments herein is to provide a networking scheme which provides fault tolerance to link failure of supervisory control from a central unit.

Another object of the embodiments herein is to provide a networking scheme which is easier to install and maintain.

These and other objects and advantages of the present invention will become readily apparent from the following detailed description taken in conjunction with the accompanying drawings.

The various embodiments herein provide a system for interconnecting a plurality of devices in building automation systems. The system comprising one or more sensor units to transmit data along with a sensor device address on a network, one or more actuator units adapted to receive the data transmitted on the network, a monitoring unit to receive, monitor and record the transmitted data from the sensor units, a control unit to monitor functioning of devices on the network and transmit data to the actuators, a link unit adapted to extend range of the network by retransmitting the signals received from one cable to other cables and an interface unit to convert signals to and from the network into a format of another communication protocol to provide integration with another network. The network comprises a plurality of devices connected to a single cable or spanning multiple cables interconnected using link units. The plurality of devices connected to the cable communicates with other devices on the network by generating charge disturbances and detecting the charge disturbances propagated over the single cable.

According to an embodiment herein, the plurality of devices on the cable is connected to a common ground reference.

According to an embodiment herein, the cable is at least one of a single wire cable, a shielded cable and a cable with one or more conducting wires.

According to an embodiment herein, an existing common power or ground cable in a building is used to interconnect the devices.

According to an embodiment herein, each sensor unit and each actuator unit comprises a unique device address.

According to an embodiment herein, each sensor unit is connected to one or more sensors and transmits the sensor data along, with the device address of the sensor unit on the network.

According to an embodiment herein, each actuator unit is connected to one or more switches to control the behavior of the switches based on the data received from at least one of the sensor units and control unit.

According to an embodiment herein, the actuator units are adapted to independently function based on the data transmitted by one or more sensor units to make the system tolerant to failures of the control unit.

According to an embodiment herein, the actuator units are higher adapted to transmit the state of the connected devices along with the actuator device address for multi-point monitoring and control of the connected devices.

The embodiments herein is adapted to be employed in building one of a security and tire safety system, a network of interconnected devices in a local area, a monitoring, scheme for an array of sensors or devices, a control scheme for an array of switches or devices, a consolidated meter reading scheme for multiple co-located energy meters for the last node connection of an automated metering infrastructure and public address systems, intercoms or access control systems in a building.

These and other aspects of the embodiments herein will be better appreciated and understood when considered in conjunction with the following description and the accompanying drawings. It should be understood, however, that the following descriptions, while indicating preferred embodiments and numerous specific details thereof, are given by way of illustration and not of limitation. Many changes and modifications may be made within the scope of the embodiments herein without departing from the spirit thereof, and the embodiments herein include all such modifications.

BRIEF DESCRIPTION OF THE DRAWINGS

The other objects, features and advantages will occur to those skilled in the art from the following description of the preferred embodiment and the accompanying drawings in which.

Although the specific features of the present invention are shown in some drawings and not in others. This is done for convenience only as each feature may be combined with any or all of the other features in accordance with the present invention.

DETAILED DESCRIPTION

In the following detailed description, a reference is made to the accompanying drawings that form a part hereof, and in which the specific embodiments that may be practiced is shown by way of illustration. These embodiments are described in sufficient detail to enable those skilled in the art to practice the embodiments and it is to be understood that the logical, mechanical and other changes may be made without departing from the scope of the embodiments. The following detailed description is therefore not to be taken in a limiting sense.

The various embodiments herein provide a system for interconnecting a plurality of devices in building automation systems. The system comprising one or more sensor units to transmit data alone with a sensor device address on a network, one or more actuator units adapted to receive the data transmitted on the network, a monitoring unit to receive, monitor and record the transmitted data from the sensor units, a control unit to monitor functioning of devices on the network and transmit data to the actuators, a link unit adapted to extend range of the network by retransmitting the signals received from one cable to other cables and an interface unit to convert signals to and from the network into a format of another communication protocol to provide integration with another network. The network comprises a plurality of devices connected to a single cable or spanning multiple cables interconnected using link units. The plurality of devices connected to the cable communicates with other devices on the network by generating charge disturbances and detecting the charge disturbances propagated over the single cable.

The plurality of devices on the cable is connected to a common ground reference.

The cable is at least one of a single wire cable, a shielded cable and a cable with one or more conducting wires.

Each sensor unit and each actuator unit comprises a unique device address. Each sensor unit is connected to one or more sensors and transmits the sensor data along with the device address of the sensor unit on the network and each actuator unit is connected to one or more switches to control the behavior of the switches based on the data received from at least one of the sensor units and control unit.

The actuator units are adapted to independently function based on the data transmitted by one or more sensor units to make the system tolerant to failures of the control unit. The actuator units are further adapted to transmit the state of the connected devices along with the actuator device address far multi-point monitoring and control of the connected devices.

Figure 1:
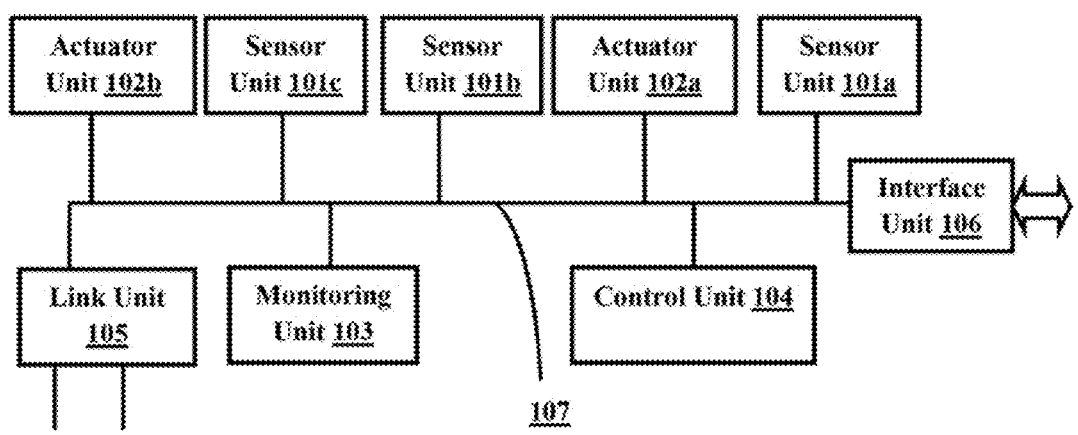
FIG. 1 is a block diagram illustrating a system for interconnecting a plurality of devices in a building automation system, according to an embodiment herein.

FIG. 1 is a block diagram illustrating a system for interconnecting a plurality of devices in a building automation system, according to an embodiment herein. The system consists of a plurality of sensor units 101a-101c and one or more actuator units 102a-102b. The system further comprises a monitoring unit 103, at least one control unit 104, a link unit 105 and lastly one or more interface units 106, all connected to a common cable 107 forming a network.

The cable 107 is one of a one wire cable, a shielded cable or any other cable with one or more conducting wires. Each sensor unit 101a-101c and actuator unit 102a-102b has a unique device address on the network. Each sensor unit 101a-101c is connected to one or more sensors or switches. The sensor unit 101a-101c transmits the data or signals on the network along with its device address. The monitoring unit 103 then receives all the signals being transmitted on the network and displays or records then for further processing. Multiple monitoring units 103 are allowed to be used and connected at any point on the network and further allowed to request any sensor unit 101a-101c or actuator unit 102a-102b to transmit its current state.

The control unit 104 besides doing monitoring functions, also transmit data to the actuator units 102a-102b. Alternately, the control unit 104 addresses one or more actuators at the same time depending on the address decoding logic defined for a given network.

Each actuator unit 102a-102b is further connected to one or more switches or appliances and it controls their behavior based on the signals that it receives from the control unit 104. The actuator units 102a-102b also independently act based on the signals transmitted by specific sensor units 101a-101c. The actuator units 102a-102b also transmits the state of their connected devices along with the actuator device address for monitoring purposes. This ensures that actuator states are synchronized across all the monitoring units 103 and gives multiple control units 104 the ability to independently control each actuator. Besides providing the flexibility of multi point monitoring and control, it also eliminates the dependency on any one control unit for the overall system to function.

The communication on this network is done by means of propagating charge disturbances on the common cable 107.

The interface unit 106 converts signals to and from the network into a format used by an alternate communication scheme such as a wireless link or the Ethernet protocol to provide easy integration with additional components or a different network. The link unit 105 is used to extend the range of the network to additional cables by retransmitting the signals it receives from any one cable to all the other cables as well. This provides scope for expanding the network and reducing the transmitted power levels of each device.

Figure 2:
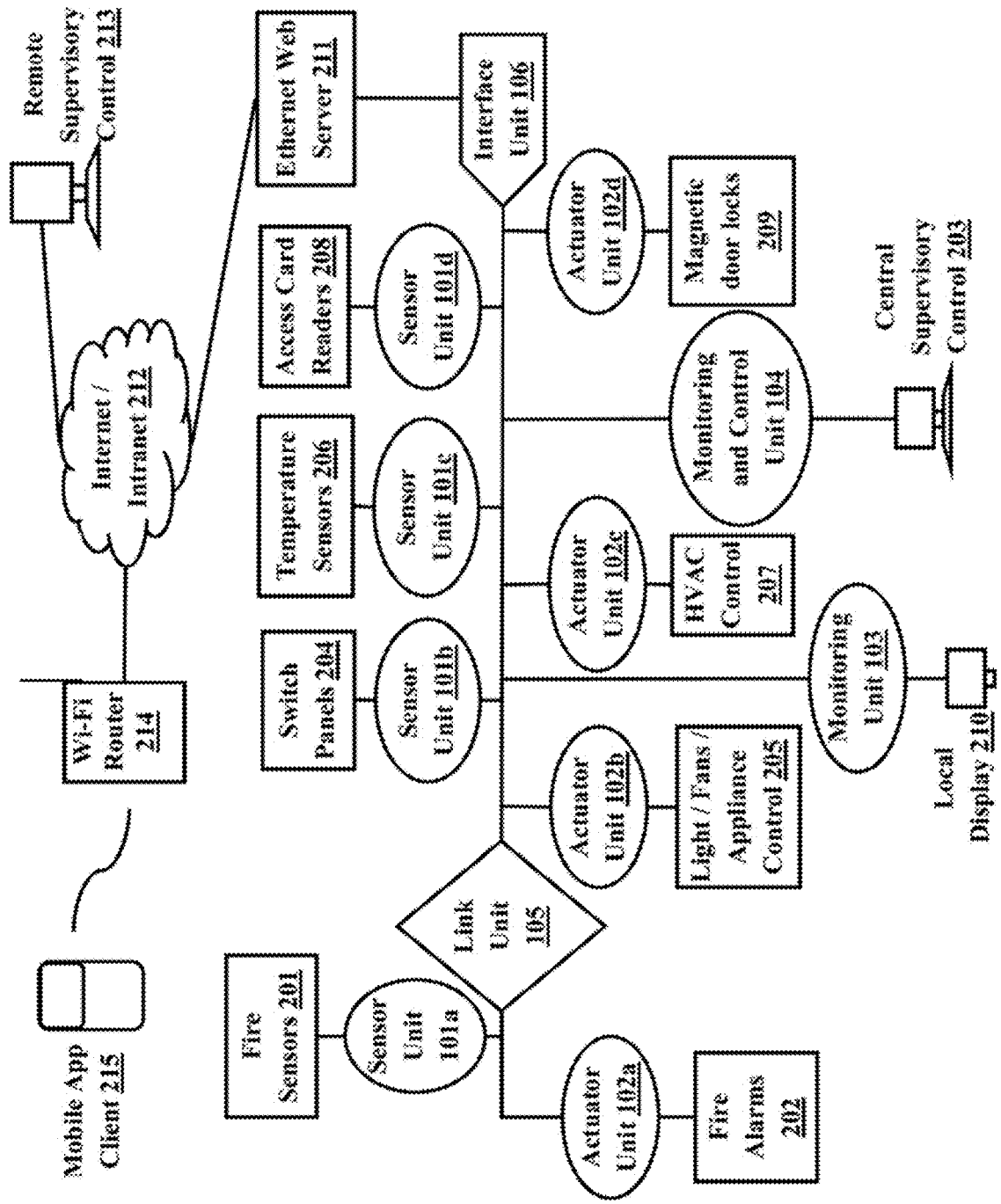
FIG. 2 is a block diagram illustrating an example scenario of implementing the networking scheme for building automation systems, according to an embodiment herein.

FIG. 2 is a block diagram illustrating an example scenario of implementing the networking scheme for building automation systems, according to an embodiment herein. The embodiments herein are easily adapted to build security and fire safety systems. One or more fire sensors 201 are connected to the sensor unit 101a which continuously monitors the sensor outputs and broadcasts a fire signal in case a fire is detected by any sensor. The actuator unit 102a detects the sensor unit 101a signals and triggers the corresponding fire alarms 202 connected to it. At the same time, the monitoring unit 103 and the control unit 104 also sense the fire signals which besides triggering fire alarms at the central monitoring office takes additional actions such as calling the fire service or unlocking the nearest fire exit doors. A local display 210 is used for viewing the output of the monitoring unit 103. At the end of the emergency, there is a provision for the control unit 104 to shut down the fire alarms by sending a request to the actuator unit 102a. The signals from one or more fire sensors 201, in this manner independently trigger alarms both locally and at a remote or central monitoring office. Further, the actuators units 102a-102d monitor signals from nearby fire sensors 201, and are able to automatically turn on alarms, light up escape routes or unlock magnetic door locks 209, without explicit instructions from a control unit 104. An advanced system is also implementable to automatically indicate the best possible escape route for any given scenario even if a part of the wired network link fails to the central control unit 104. In such systems, the control unit 104 is used or central supervisory control 203 and data acquisition.

The link unit 105 keeps dedicated tire systems isolated from other groups of network devices. This enables special fireproof cables to be laid exclusively for the fire safety systems while all the other devices go through a separate link. The sensors unit 101b connected to the switch panel 204 senses the state of the switches for fans, lights and other appliances and broadcasts any state changes on the network. The actuator unit 102b connected to the light/fan/appliance control 205 takes the necessary actions when it detects the switch state change signals. The temperature sensors 206 connected to the sensor unit 101c senses temperatures of the rooms and depending on the temperature the actuator unit 102c adjusts the HVAC control 207 to modify the AC settings. The sensor unit 101d connected to the access card reader 208 broadcasts all access attempts while the actuator unit 102d controls the magnetic door locks 209 providing secure access to authorized personal. Depending on the logins and logouts of personnel from a specific building zone, the central control unit 104 also turns ON/OFF the lights and AC of the corresponding zones. The interface unit 106 provides integration with an Ethernet based web server 211 to enable monitoring and control of the devices on the network via remote access such as remote supervisory control 213 to the web server over the intranet or internet 212. A Mobile app client 215 is able to connect with the web server via Wi-Fi Router 214, Bluetooth, GPRS, SMS or any available wireless connection.

An array of sensors or devices is also monitored using this networking scheme. One or more sensors or devices are connected to the network using a sensor unit and the data from multiple sensor units are allowed to be consolidated and processed further by one or more monitoring units. This also allows to be used and obtain the consolidated readings of multiple co-located energy meters for the last node connection of an automated metering infrastructure.

The network has the flexibility of communicating from one to one unit (sensor to actuator), one to many (sensor to monitor units) and many to one (control units to actuator). This flexibility is useful for implementing public address systems, intercoms or and access control systems in a building. The control signals, data signals and voice signals are communicated independently either using parallel cable networks or using different frequency bands on the same cable network.

The embodiments herein provide for lower power dissipation, easier to install, troubleshoot and maintain, scalable deployment of additional features, multi-point monitoring and control, fault tolerance to link failure of supervisory control from a central unit, lower cost when compared to Ethernet based systems and multiple communication channels using different frequency bands. The system envisaged by the embodiments herein can also be utilized in a security and tire safety system, a network of interconnected devices in a local area (LAN), a monitoring scheme for an array of sensors/devices, a control scheme for an array of switches or devices, a consolidated meter reading scheme for multiple co-located energy meters for the last node connection of an automated metering infrastructure; and public address systems, intercoms and access control systems in a building.

The foregoing description of the specific embodiments will so fully reveal the general nature of the embodiments herein that others can, by applying current knowledge, readily modify and/or adapt for various applications such specific embodiments without departing from the generic concept, and, therefore, such adaptations and modifications should and are intended to be comprehended within the meaning and range of equivalents of the disclosed embodiments. It is to be understood that the phraseology or terminology employed herein is for the purpose of description and not of limitation. Therefore, while the embodiments herein have been described in terms of preferred embodiments, those skilled in the art will recognize that the embodiments herein can be practiced with modification within the spirit and scope of the appended claims.

Although the embodiments herein are described with various specific embodiments, it will be obvious for a person skilled in the art to practice the invention with modifications. However, all such modifications are deemed to be within the scope of the claims. It is also to be understood that the following claims are intended to cover all of the generic and specific features of the embodiments described herein and all the statements of the scope of the embodiments which as a matter of language fill there between.

What is claimed is:

1. A system for interconnecting a plurality of devices in a network for building management and home automation systems, the system comprising:
   one or more sensor units configured to transmit data along with a sensor device address to a plurality of devices on a first network;
   one or more actuator units adapted to receive the data transmitted on the first network;

one or more monitoring units configured to receive, monitor and record the transmitted data from the one or more sensor units;

one or more control units configured to monitor functioning of devices on the first network and transmit data to the one or more actuators units;

a link unit adapted to extend the transmission range of the first network by retransmitting the signals received from one cable to other cables; and an interface unit configured to convert signals to an the first network into a format of another communication protocol to provide integration with a second network;

wherein the first network comprises a plurality of devices connected to a conducted without a return loop, and wherein the plurality of devices communicates with one another over the first network by generating and propagating charge disturbances on the conductor without a return loop and by detecting the charge disturbances propagated over the conductor without a return loop, and wherein each actuator unit is connected to at least one switch to control a behavior of the switch based on the data received from said sensor unit(s) and the one or more control units, and wherein the one or more actuator devices are adapted to independently function based on the data transmitted by said sensor device(s), to render the system tolerant to link failures of the controller unit, and wherein states of the actuator unit devices are synthesized across the one or more monitoring unit to enable the one or more control units to control each actuator device independently, and wherein the one or more actuators unit are further adapted to transmit the state of the connected devices along with the actuators device address for multi-point monitoring and control of the connected devices, and wherein each control units is configured to transmit data to one or more actuator unit at a same time depending on an address decoding logic defined for a given network.

2. The system of claim 1, wherein the plurality of devices are selectively connected to a common ground reference, and wherein the plurality of devices is connected to a common power or ground cable that exists in a building.

3. The system of claim 1, wherein each sensor unit is connected to at least one sensor and configured to transmit the sensor data along with the device address of the sensor unit on the network, and wherein the sensor unit is selected from a group consisting of fire sensor, switch panel, temperature sensor, and success card reader.

\* \* \* \* \*